Patented Sept. 9, 1952

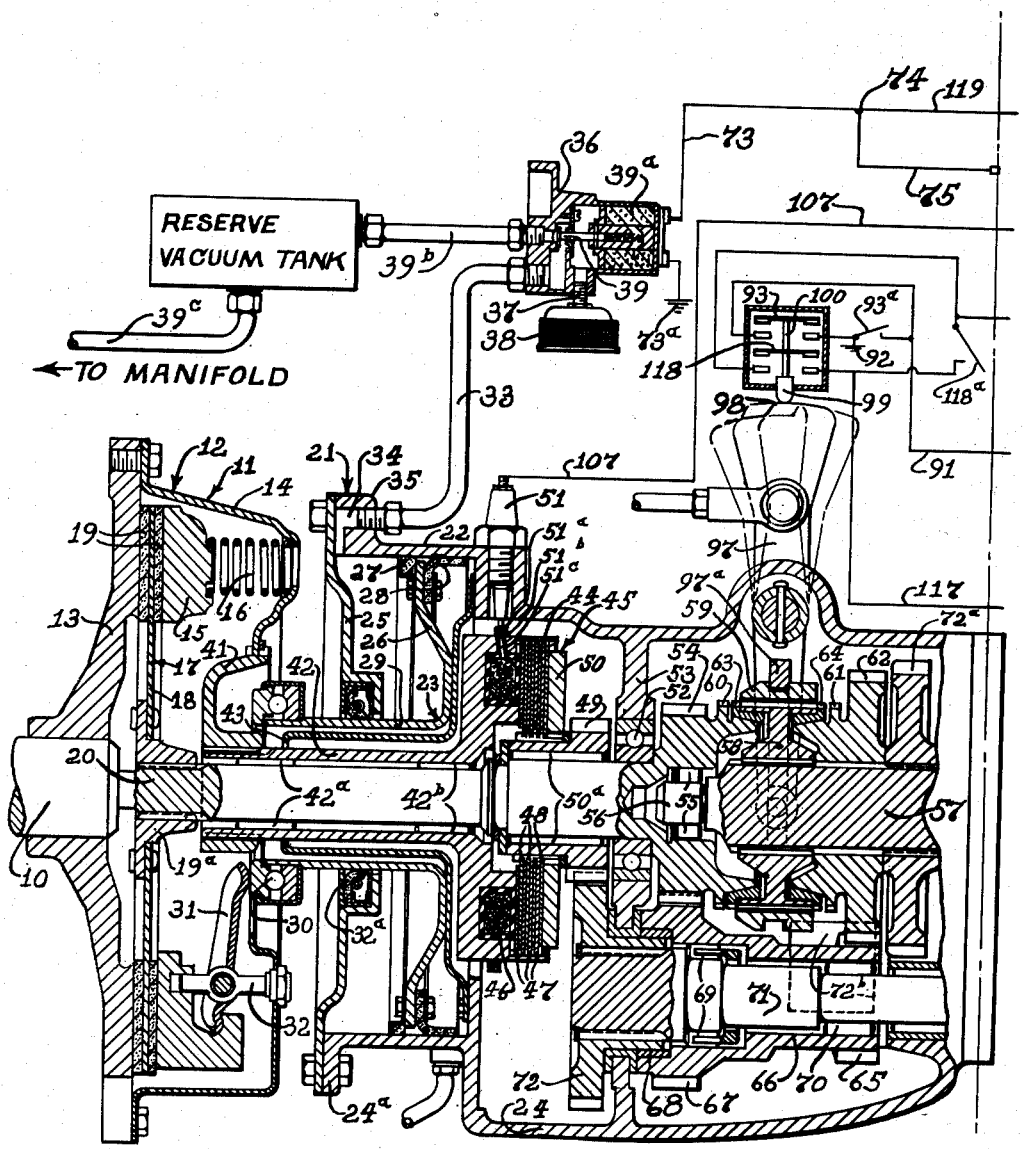

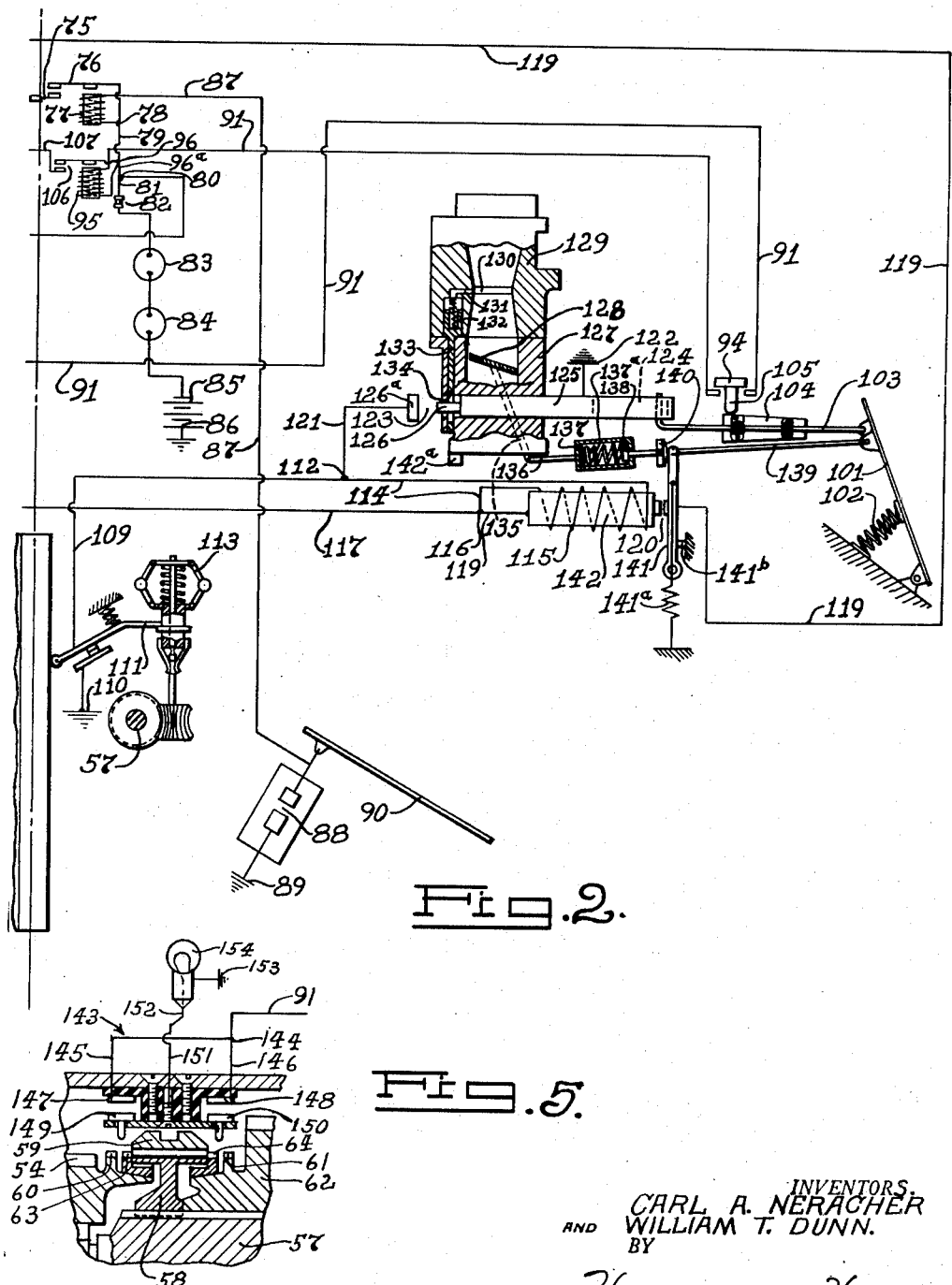

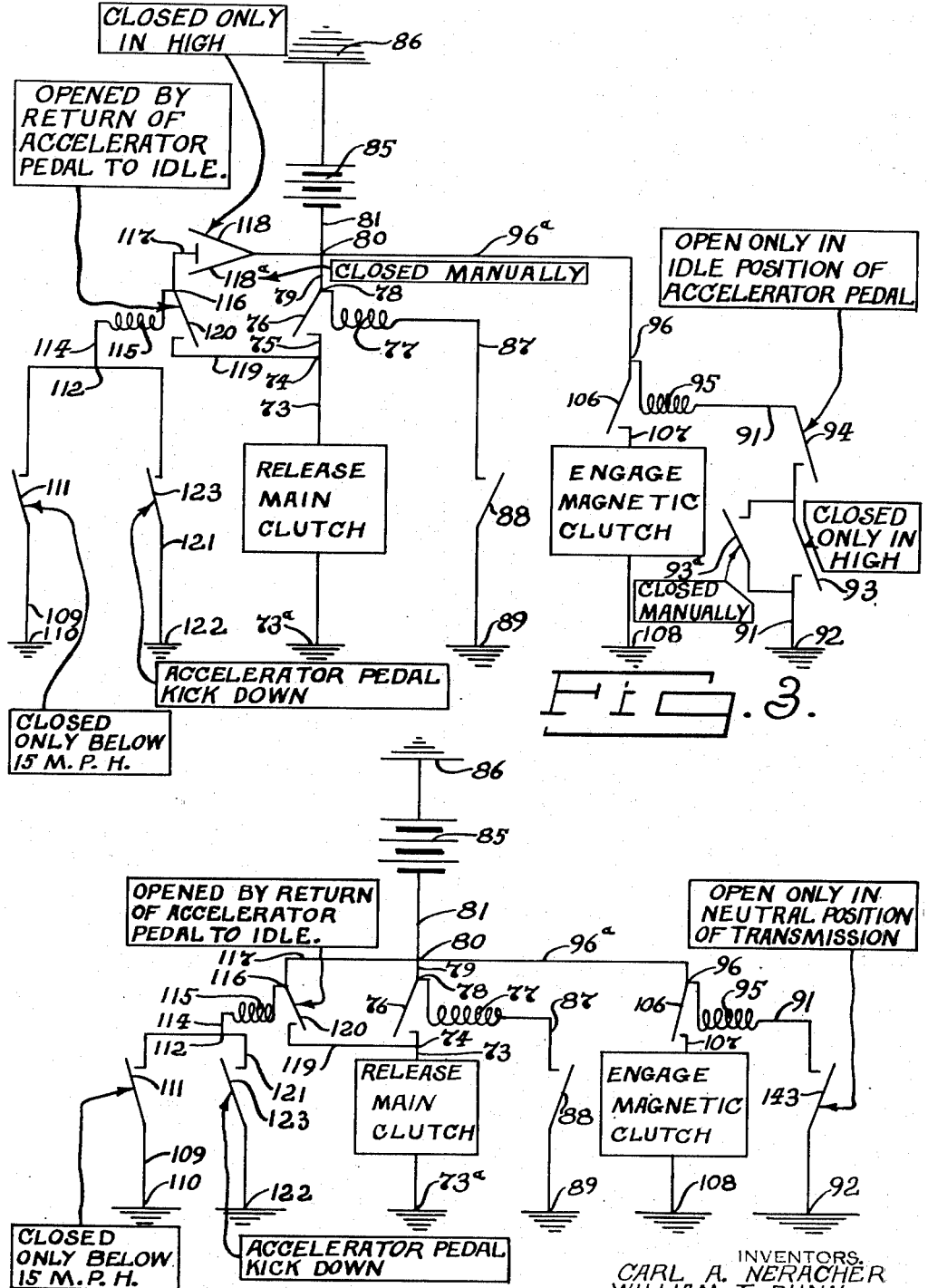

2,609,900

UNITED STATES PATENT OFFICE 2,609,900

POWER TRANSMISSION

Carl A. Neracher and William T. Dunn, Detroit, Mich., assignors to Chrysler Corporation, Highland Park, Mich., a corporation of Delaware Application October 7, 1944, Serial No. 557,568

26 Claims. (Cl. 192—.098)

1

This application relates to a means for obtaining various speeds of a driven means for a given speed of a driving means. More specifically it relates to the association of a dual input with a change-speed transmission.

It is known to associate a change-speed transmission of an automobile with the accelerator pedal and various other controls in such a way that the transmission may be shifted by such conditions as positions of the accelerator pedal and car speed. The shifting has taken place within the transmission itself, being accomplished, for example, by a synchronizer sleeve in the transmission or by planetary gearing in the transmission. We propose to eliminate certain disadvantages in construction of this sort by the use of a dual input to the transmission.

An object of the present invention is to provide improvements in the association of a transmission and a dual input therefor. The dual input may advantageously be a magnetic clutch and a vacuum-operated friction clutch.

A further object is to employ with a dual input for a transmission, controls therefor operable by means of an accelerator and a speed governor.

Another object is to provide improvements in a control device for a clutch. The device may be applied to a clutch connecting an engine with a transmission.

A still further object is to provide overrunning means in a dual input to a transmission for simplifying the control procedure involved in shifting of the transmission.

Still another object is to provide improvements in the installation of a magnetic clutch as part of a dual input to a transmission.

Other objects will appear from the disclosure.

In the drawings:

Fig. 1 is a view of the novel transmission of the present invention in section and a showing of a portion of the controls therefor;

Fig. 2 is a view of the remainder of the controls and is intended to be placed side by side with Fig. 1, the dash-dot line at the left side of Fig. 2 coinciding with the dash-dot line at the right side of Fig. 1;

Fig. 3 is a schematic view in slightly different form of the controls of Figs. 1 and 2;

Fig. 4 is a schematic view, similar to that of Fig. 3, of a modified form of controls for the transmission; and Fig. 5 is a sectional view showing a portion of the controls of Fig. 4.

The reference character 10 designates a driving means, for instance a shaft that may be directly connected to an engine as is a crankshaft or may be connected with the engine through a fluid coupling. A main clutch 11 has a driving part 12 including a hub 13 secured to the shaft 10. The driving part 12 also has a casing 14 secured to the hub 13 and a pressure ring 15 influenced by springs 16, of which only one is shown. The clutch 11 has a driven part 17 formed of a disk 18 and annuli 19 formed of friction material and secured to the opposite faces of the disk 18. A hub member 19$^a$ secures the disk 18 to an intermediate shaft 20. The clutch 11 is controlled by a vacuum-operated device 21 composed of a cylinder 22 and a piston 23. The cylinder 22 is part of a transmission casing 24 and has a flange 24$^a$ to which is secured a nonplanar generally radial end member 25. The piston 23 has a radial portion 26 to the outer edge of which are secured a seal 27 and an L-shaped ring 28. The piston 23 also has an axial portion 29 to the end of which is secured a ball-bearing thrust device 30 engageable with the inner end of a lever 31. The lever is fulcrumed on a stud 32 secured to the casing 14. The outer end of the lever engages in a recess in the pressure ring 15. A seal 32$^a$ is positioned between the end member 25 and the axial portion 29 of the piston 23. A conduit 33 is connected with a passage 34 formed in an enlarged portion 35 of the flange 24$^a$ of the cylinder 22 and also with a fitting 36. Also connected with the fitting 36 is a pipe section 37 leading to an air cleaner 38 open to atmospheric air. Mounted within the fitting 36 is a valve 39 controlled by a solenoid 39$^a$. A conduit 39$^b$ is connected to the fitting 36 and to a reserve vacuum tank, to which is connected a line 39$^c$ leading to a source of vacuum such as an engine manifold. With no current flowing through the solenoid 39$^a$ the valve 39 is in the position shown, blocking communication between the line 33 leading to the vacuum-operated device 21 and the line 39$^b$ leading to the source of vacuum. In this position of the valve 39 communication is provided between the line 33 and the air cleaner 38 through the space surrounding the stem of the valve 39. When current is made to flow through the solenoid 39$^a$, the valve 39 is drawn to the right, connecting the line 33 with vacuum and disconnecting it from the atmosphere.

The casing 14 forming a portion of the driving part 12 of the clutch 11 is drivingly connected to a hub 41 secured to one end of a sleeve 42 surrounding the shaft 20 and journalled thereon by bearings 42ª and 42ᵇ and in turn being surrounded by a member 43 fitting within the vacuum-operated device 21. The other end of the sleeve 42 is enlarged and extends outwardly to form a part 44 of an auxiliary clutch comprising the magnetic clutch 45. The magnetic clutch also includes an annular coil 46 set in the part 44, sets of disks 47 and 48, spaced alternately between one another and keyed, respectively, to the part 44 and to a gear member 49, and a movable part 50, keyed to the gear member 49 so as to be shiftable toward the part 44 and coil 46 during the flow of electric current through the coil 46 so as to effect driving engagement between the disks 47 and 48. The gear member 49 is journalled on the shaft 20 by a bearing 59ª. Current is applied to the coil 46 through a connector 51, contacting a conducting ring 51ª mounted on the part 44 but electrically insulated therefrom by a ring 51ᵇ. An insulated conductor 51ᶜ connects the conducting ring 51ª and the coil 46.

The right end of the intermediate shaft 20, as viewed in Fig. 1, is journalled in a ball bearing 52 carried in a wall 53 of the transmission casing 24. The right end of the shaft is enlarged so as to form a gear 54 and is hollowed out to carry in a roller bearing 55 the reduced end 56 of a transmission driven means, for instance, an output or driven shaft 57. Keyed to the shaft 57 is a member 58, to which is slidably splined a connector sleeve 59. Blocker members 63 and 64 are associated with the connector member 59 and are frictionally engageable with toothed sections 60 and 61, respectively, formed on the shaft 20 adjacent the gear 54 and a gear 62. Direct drive is established between gear 54 and driven shaft 57 by engagement of the connector 59 with toothed section 60. This is accomplished by shifting of the connector 59 toward the gear 54. The blocker 63 prevents movement of the connector 59 across it until the speeds of the gear 54, the blocker 63, and the connector 59 are the same. When this condition arises, the blocker 63 permits the connector 59 to be moved across it into driving engagement with the toothed section 60, and thereby direct drive is established between the gear 54 and the driven or output shaft 57. Indirect drive is established between gear 54 and driven shaft 57 by engagement of the connector 59 with toothed section 61. This is accomplished by shifting of the connector 59 toward the gear 62. The blocker 64 prevents movement of the connector 59 toward the gear 62. The blocker 64 prevents movement of the connector 59 across it until the speeds of the gear 62, the blocker 64, and the connector 59 are the same. When this condition arises, the blocker 64 permits the connector 59 to be moved across it into driving engagement with the toothed section 61, and thereby indirect drive is established between the gear 54 and the driven or output shaft 57; i. e., the drive goes from gear 54 through gears 67 and 65 on sleeve 66, gear 62, toothed section 61, connector 59, and member 58 to shaft 57. The sleeve 66 is mounted by a short bearing sleeve 68, overrunning clutch 69, and a bearing 70 upon a shaft 71. A gear 72 meshing with the gear 49 is keyed to the shaft 71. When the clutch 11 is disengaged, and the magnetic clutch 45 is engaged, drive is transmitted from the driving shaft 10 to the driven shaft 57, through the driving part 11, hub 41, sleeve 42, magnetic clutch 45, gear 49, gear 72, shaft 71, overrunning clutch 69 and sleeve 66; thence alternately through gears 67 and 54 for direct drive or through gears 65 and 62 for indirect drive. The blocker members 63 and 64 have the same function whether drive is transmitted through main clutch 11 or through magnetic clutch 45. Blocker 63 prevents the connector 59 from engaging the toothed section 60 until the speeds of connector 59, blocker 63, and toothed section 60 are the same. Blocker 64 prevents the connector 59 from engaging the toothed section 61 until the speeds of the connector 59, the blocker 64, and the toothed section 61 are the same. Full details of the blocker members 63 and 64 and their connections with associated parts have not been shown, since they are standard and form per se no part of the present invention.

It will be appreciated that the magnetic clutch 45 will provide a lower speed of the driven shaft 57 for a given speed of the driving shaft 20 than will the main clutch 11, for as is to be seen from Fig. 1, the gears 49 and 72, through which drive from the magnetic clutch is transmitted, are, respectively, smaller and larger than gears 54 and 67, through which drive is transmitted from the gears 49 and 72 for the higher speed derivable from the magnetic clutch or through which drive from the main clutch 11 is transmitted at reduced speed.

The transmission and the clutches 11 and 45 will provide the output shaft 57 with four forward speed ratios with respect to the input or driving shaft 10. These four speed ratios are as follows and are obtained as follows: first—magnetic clutch 45, gear 49, gear 72, shaft 71, sleeve 66, gear 65, gear 62, sleeve 59, and member 58, in other words, magnetic clutch and indirect drive of transmission; second, main clutch 11, shaft 20, gear 54, gear 67, sleeve 66, gear 65, gear 62, connector 59, and member 58—in other words, main clutch and indirect drive of transmission; third—magnetic clutch 45, gear 49, gear 72, shaft 71, sleeve 66, gear 67, gear 54, connector 59, and member 58—in other words, magnetic clutch and direct drive of transmission; and fourth—main clutch 11, shaft 20, gear 54, sleeve 59, and member 58—in other words, main clutch and direct drive of transmission.

The overrunning clutch 69 is so arranged as to cause the shaft 71 to drive the sleeve 66 in the forward direction, while permitting the sleeve 66 to overrun the shaft 71 in the forward direction. This means that the magnetic clutch 45 can be engaged even though the drive is through the main clutch 11.

A reverse gear 72ª is splined upon the output shaft 57. This gear is adapted to be engaged by an idler gear 72ᵇ through movement of the idler gear to the right of the position shown in Fig. 1. The idler gear 72ᵇ is always in mesh with the gear 65.

The control of the clutches is shown in Figs. 2 and 3. A line 73 extends from a ground 73ª through the solenoid 39ª to a connection point 74, from which a line 75 extends through a switch 76 controlled by a relay coil 77 to a connection point 78. A line 79 extends from point 78 to a connection point 80, from which extends a line 81 through a fuse 82, an ignition switch 83, an ammeter 84 (these three being shown only in Fig. 2), and a battery 85 to a ground 86. A line 87 extends through the relay coil 77 and a manually controlled switch 88 to a ground 89. The switch 88 may be controlled by a foot pedal 90, which is substituted for the usual clutch pedal. Closing of the switch 88 causes current to flow through the coil 77, thereby closing the switch 76. This causes current to flow in the solenoid 39ª, and so the valve 39 is shifted so as to connect vacuum to the line 33 and to the cylinder 22 and thereby to pull the piston 23 to the left as viewed in Fig. 1. The device 30 connected with the piston 23 moves to the left into engagement with the inner end of the lever 31, causing it to move pressure ring 15 to the right, thereby disengaging clutch 11. This is done when the transmission is to be shifted.

A line 91 runs from a ground 92 through switches 93 and 94 and a relay coil 95 to a connection point 96. A line 96ª extends from the connection point 96 to the connection point 80. The switch 93 is arranged so as to be closed only when the transmission is in direct drive, i. e., only when the gear 54 is directly connected to the driven shaft 57 by engagement of the connector 59 with the toothed section 60. This arrangement is shown in Fig. 1, wherein a shifter member 97 controls at its lower end a yoke part 97ª engaging the connector 59 and has at its upper end a cam with a raised portion 98 contacting a follower 99 connected to a rod 100. Fig. 1 shows the transmission in neutral. The shifter member 97 is so positioned as to cause the raised portion 98 of the cam to contact the follower 99, holding switches 93 and 118 open. Positions of the shifter member 97 in direct and indirect drives of the transmission are represented by dash-dot lines on opposite sides of the shifter member, and from these it will be seen that when the transmission is in indirect drive, the raised portion 98 will contact the follower 99 holding switch 93 open, and when the transmission is in direct drive the raised portion 98 will be out of contact with the follower 99, and the switch 93 will be closed by gravity action or by some suitable means, not shown, such as a spring. If desired, a manually operated switch 93ª may be connected in a line shunting switch 93. The purpose of switch 93ª will be described in the description of operation. The switch 94 is open only in the idle position of a throttle control member, for instance, an accelerator pedal 101, shown in Fig. 2. When the operator's foot is removed from the pedal 101, it is automatically returned to the idle position of Fig. 2 by a spring 102. Connected to the pedal 101 is a rod 103, upon which is mounted a cam 104 contacting a follower portion 105 of the switch 94. The cam 104 is so shaped that when the pedal 101 is depressed, the follower portion 105 is lowered, and the switch 94 is closed. When both switches 93 and 94 are closed, current flows through the coil relay 95, causing the closing of a switch 106 in a line 107 extending from connection point 96 through magnetic clutch 45 to a ground 108 (shown only in Fig. 3). When switch 106 is closed, current flows in the magnetic clutch and thereby causes it to become engaged.

A line 109 extends from a ground 110 through a switch 111 to a connection point 112. The switch 111 is controlled by a speed governor 113, driven by the output or driven shaft 57. The governor 113 may be so arranged as to be operative upon rise of the vehicle speed to fifteen miles per hour to open the switch 111 and upon fall of the vehicle speed to twelve miles per hour to close the switch 111. Thus a hunting action of the governor is prevented, which would cause operation of the vehicle at a critical speed to make the governor open and close the switch 113 almost continuously. However, the invention is not limited to the use of a governor of this type, since any suitable speed-responsive governor may be employed. The governor could be of the type that would simply operate to open and close the switch 111 at one speed such as fifteen miles per hour. A line 114 extends from connection point 112 through a relay coil 115 to a connection point 116, from which a line 117 leads through a switch 118 to the connection point 80. The switch 118 is closed only in the direct-drive position of the transmission, and this is accomplished in the same way as in the case of the switch 93. As seen in Fig. 1, the switch 118 is connected to the rod 100 and so is controlled by the raised cam portion 98 controlled by the shifter member 97 for the sleeve 59 of the transmission. If desired, a manually operated switch 118ª may be connected in a line shunting switch 118. The purpose of switch 118ª will be described in the description of the operation. A line 119 extends from the connection point 116 through a switch 120 to the connection point 74. When the speed of the vehicle is below the low speed such as twelve or fifteen miles per hour and the transmission is in direct drive, the switches 111 and 118 will be closed, and current will flow through relay coil 115, closing switch 120. This sends a current through line 73 and solenoid 39ª, disengaging the main clutch 11.

A line 121 extends from a ground 122 through a switch 123 to the connection point 112. The switch 123 is closed by a so-called "kickdown" position of the accelerator pedal 101, shown in Fig. 2. As seen in this figure, the left end of the rod 103 is bent and fitted in an elongated slot 124 in a member 125 having a reduced end 126 forming a part of the switch 123, the other part of the switch being the element 126ª. The member 125 is slidably mounted in a fitting 127 forming part of an intake line for fuel leading to the engine, in which is mounted a throttle valve 128. A fitting 129 has a conventional carburetor Venturi section 130 to which is connected a passage 131 connected in turn to a bore in which is mounted a plunger 132 spring-urged downwardly as shown. The plunger has an extension 133 slidably mounted in the fitting 127 and provided with an opening 134, through which the reduced end 126 extends. When the speed of the car reaches a certain high value, for example, fifty miles per hour, and the throttle valve 128 is in wide open position, the suction at section 130 becomes sufficient to raise the plunger to the extent that the lower edge of the opening 134 in the extension 133 blocks leftward movement of the member 125 so as to prevent closing of the switch 123.

The throttle valve 128 is operated by an arm 135 secured thereto and connected to a short rod 136, to which is secured a cylinder 137. The cylinder houses a spring 137ª which holds a disk 138 against the right end of the cylinder. The disk 138 is secured to one end of a link 139, the other end of which is connected to the accelerator pedal 101. The link 139 carries a member 140 engageable with a pivoted arm 141 to which is attached one contact of the switch 120. The arm is biased by an over-center spring 141ª. The other contact of the switch 120 is attached to a core 142 for the relay coil 115. The arm 141 contacts a stop 141ᵇ in open position of the switch 120.

When the accelerator pedal 101 is depressed sufficiently to move the throttle 128 to fully open position, the arm 135 will have contacted a stop 142ᵃ and the bent end of the rod 103 will have reached the left end of the slot 124 in member 125. Further depression of the accelerator pedal may take place without effect upon the throttle because the spring 137ᵃ in the cylinder 137 permits the disk 139 to move with respect thereto, and such further depression of the accelerator pedal will cause the member to be moved to the left until the switch 123 is closed. This is known as "kickdown" position of the accelerator pedal. The result of closing the switch 123 is to energize the coil 115 and thereby to close switch 120. This causes current to flow in the solenoid 39ᵃ, resulting in actuation of the vacuum-operated device 21 and disengagement of the clutch 11. Although now the accelerator pedal 101 is raised somewhat, the switch 123 remains closed, for the member 125 is not moved to the right until the bent end of the rod 103 reaches the right end of slot 124 in member 125, this occurring only when the accelerator pedal 101 reaches idle position.

The operation of the device just described will now be summarized.

When the vehicle is to be started, the driver depresses the pedal 90, closing switch 88. Therefore, the coil 77 is energized, the switch 76 is closed, the vacuum-operated device 21 is actuated, and the clutch 11 is disengaged. This makes it possible for the operator to shift the transmission to indirect, direct, or reverse drives. Assume that indirect drive is desired. Then, while clutch 11 is disengaged, the driver shifts the transmission into indirect drive, i. e., shifts sleeve 59 to the right effecting a direct driving connection between the gear 62 and the member 58, which provides an indirect driving connection between gear 54 and output shaft 57 through gear 67, sleeve 66, gear 65, gear 62, connector 59, and member 58. Now the operator causes the pedal 90 to rise, thereby opening switch 88. Since in the indirect driving position of the transmission, the raised portion 98 of the cam causes the switches 93 and 118 to be open, with switch 88 opened by the operator and switch 118 open by indirect driving position of the transmission, the clutch 11 becomes re-engaged and indirect drive is transmitted from shaft 10 through clutch 11, shaft 20, gears 54, 67, 65, 62 and connector 59, to the output or driven shaft 57. Thus output shaft 57 is driven at the indirect or second speed ratio. Since switch 93 is open, magnetic clutch 45 is not engaged, and even though it were engaged, drive would still be through clutch 11 because of the overrunning clutch 69. The magnetic clutch 45 cannot become engaged, and the main clutch 11 cannot become disengaged so long as pedal 90 is not depressed. Drive is transmitted only through the clutch 11. One advantage is that on starting the vehicle when high torque is required, the magnetic clutch 45, which might easily be damaged through injudicious application of load and torque, is protected by being kept out of use.

However, if a first speed starting ratio of the output shaft 57 is required, i. e., drive through the magnetic clutch and indirect drive of the transmission, the manually controlled switches 93ᵃ and 118ᵃ are closed. This establishes a circuit through the solenoid 115 since the governor switch 111 is also then closed. The solenoid 115 is now energized. Then the operator depresses the pedal 90 to close switch 88 and shifts the transmission into indirect drive position and then releases the pedal 90 and depresses the accelerator which operations permit the energized solenoid 115 to close the switch 120 and switch 94 to be closed. In this manner a circuit is established through the valve solenoid 39ᵃ by way of the switches 118ᵃ and 120 thereby energizing the solenoid 39ᵃ to keep the clutch 11 disengaged, and a circuit is established through the switches 93ᵃ, 94 to energize the relay coil 94 closing the switch 106 to establish a circuit from the battery through the Zoden clutch coil 46 to energize the Zoden clutch 45 and establish drive through the driving part 12 of the clutch 11, hub 41, sleeve 42, magnetic clutch 45, gear 49, gear 72, shaft 71, gear 65, gear 62, sleeve 59, and member 58 to the driven shaft 57. Presumably the speed of the vehicle in the first speed ratio of the output shaft 57 will remain below fifteen miles per hour, and so the switch 111, which is to be opened by the governor 113 above a vehicle speed of fifteen miles per hour, will remain closed. Thus the main clutch 11 will remain disengaged, and drive will continue through the magnetic clutch. Thus presumably when the transmission is in indirect drive, and the switches 93ᵃ and 118ᵃ are closed, the output shaft 57 will continue in the first speed ratio. However, if the vehicle does attain a speed of fifteen miles per hour, the governor 113 causes the switch 111 to open. In spite of the resultant deenergizing of the coil 115, the switch 120 remains closed, because the overcenter spring 141ᵃ holds the arm 141 in the position maintaining a closed condition of the switch 120. If the operator now wishes to bring the output shaft 57 to second speed ratio, he permits the accelerator pedal 101 to return to idle position. This causes member 140 to move arm 141 to the right, thereby opening switch 120. Now the solenoid 39ᵃ is no longer energized, and the main clutch 11 is engaged. The operator now depresses the accelerator pedal 101 as required to maintain the speed of the vehicle above fifteen miles per hour, and the switch 94 is closed, causing the magnetic clutch 45 to become engaged. In spite of this, drive is through the main clutch, since the overrunning clutch 69 causes the magnetic clutch to be overrun.

If the operator wishes to change the output shaft 57 from the first speed ratio to the second speed ratio, even though the speed of the vehicle is below fifteen miles per hour, he will open the switches 93ᵃ and 118ᵃ. This action engages main clutch 11 and disengages magnetic clutch 45, and so the output shaft 57 is in the second speed ratio.

When the operator desires, he may shift the transmission to direct drive. If the output shaft has been in first or second speed ratio, and the switches 93ᵃ and 118ᵃ have been closed, he will open these switches and depress the pedal 90. Opening of switch 93ᵃ disengages magnetic clutch 45, and depression of pedal 90 causes closing of switch 88. This causes energization of solenoid 39ᵃ and disengagement of main clutch 11 in spite of opening of switch 118ᵃ. The operator now moves the connector 59 out of engagement with the toothed section 61 on gear 62 into engagement with the toothed section 60 on gear 54. Thus gear 54 is directly connected with output shaft 57. This action causes the high portion 98 of the cam to move out of contact with the follower 99, and the switches 93 and 118 are closed. Then the operator causes the pedal 90 to rise, thereby opening switch 88. The operator also depresses the accelerator pedal 101, closing switch 94 and thereby engaging magnetic clutch 45. If the vehicle speed is below twelve miles per hour, the switch 111 is closed, coil 115 is energized, switch 120 is closed, and solenoid 39a is energized so that the main clutch is disengaged. Drive is through the magnetic clutch 45, and since the transmission is in direct drive, the output shaft is in the third speed ratio. On the other hand, if the speed of the vehicle is above fifteen miles per hour, and the output shaft has been in the first speed ratio, and the operator desires the fourth speed ratio of the output shaft 57, the accelerator pedal 101 must be released to idle position during or before depression of the pedal 90 in order to cause the member 140 to move the member 141 to the right against the action of the over-center spring 141b, thereby opening switch 120 to permit reengagement of the main clutch 11. In contrast with this, if the output shaft has been in the second speed ratio rather than in the first, and the speed of the vehicle is above fifteen miles per hour, release of the pedal 90 after shift to direct drive of the transmission will bring the output shaft 57 to the fourth speed ratio even without release of the accelerator pedal to idle position, for the switch 120 will already be open, thereby causing the main clutch 11 to be engaged.

Let it be assumed that the output shaft 57 is in the third speed ratio. The operator controls the vehicle as desired. If the speed of the vehicle rises above fifteen miles per hour, he may bring the shaft 57 to the fourth speed ratio. To do this he lets the accelerator pedal 101 return to idle position. This causes member 140 to move member 141 to the right opening switch 120. Since the vehicle speed is above fifteen miles per hour, the switch 111 is open, coil 115 is not energized, and switch 120 stays open. Thus solenoid 39a is not energized, and the main clutch 11 is now engaged. Drive is through the main clutch, and since the transmission is in direct drive, the output shaft is in the fourth speed ratio.

If the output shaft before shift of the transmission to direct drive has been in second speed ratio, and the switches 93a and 118a have been open, the operator obtains direct drive of the transmission and third or fourth speed ratio of the output shaft 57 by leaving the switches 93a and 118a open and proceeding otherwise as outlined in the two paragraphs immediately preceding.

It has been previously stated that the speed governor 113 may be of the type that opens the switch 111 upon rise of the vehicle speed to fifteen miles per hour or above and closes the switch 111 upon fall of the vehicle speed to twelve miles per hour or below, thereby preventing continuous opening and closing of the switch 111 at a critical speed. If the governor 113 is of the type opening and closing the switch at the same speed, for example, fifteen miles per hour, such continuous opening and closing may occur during operation. If the switch 120, once closed, were not arranged to remain closed under the action of the over-center spring 141b and to open only through return of the accelerator pedal 101 to idle position and resultant movement of the arm 141 to the right by the member 140, but instead were arranged to open merely upon deenergization of the coil 115, then the use of a governor 113 opening and closing the switch 113 at the same speed would result in continuous engaging and disengaging of the main clutch 11 and changing of the output shaft 57 between third and fourth speed ratios during direct drive of the transmission and between first and second speed ratios during indirect drive of the transmission and closed condition of the switches 93a and 118a. However, with switch 120 controlled as disclosed herein there will be no continuous engaging and disengaging of the main clutch 11, even if the governor 113 does continuously open and close the switch 111 at such a vehicle speed as fifteen miles per hour, for the switch 120 is not opened, as it is closed, through arrival of vehicle speed at fifteen miles per hour, but is opened by return of the accelerator pedal 101 to idle position. Thus there may be two safeguards against continuous engaging and disengaging of the main clutch 11: (1) a governor 113 of the type opening the switch 111 at fifteen miles per hour or above and closing the switch 111 at twelve miles per hour or below, and (2) the switch 120 controlled as disclosed herein.

Suppose that the transmission is in direct drive; that vehicle speed is above fifteen miles per hour resulting in causing the governor 113 to open the switch 111; that the operator has through release of the accelerator pedal 101 to idle position caused the switch 120 to be opened and thereby the main clutch 11 to be engaged; and that on this account the output shaft 57 is in the fourth speed ratio. Suppose further that then the speed of the vehicle drops below twelve miles per hour. The governor 113 now closes the switch 111, causing the coil 115 to be energized, the switch 120 to be closed, solenoid 39a to be energized, and main clutch to be disengaged. Now drive is through the magnetic clutch 45, which is engaged if the accelerator pedal 101 is depressed at all and thereby switch 94 is closed. The output shaft 57 is now operated in the third speed ratio, since the transmission is in direct drive, and only the magnetic clutch 45, not the main clutch 11, is engaged.

If, during operation of the output shaft in the third speed ratio, vehicle speed rises to fifteen miles per hour or above, and the operator wishes to return the output shaft to the fourth speed ratio, he will release the accelerator pedal to idle position, thereby causing the member 141 to move the arm 140 to the right and opening the switch 120. This deenergizes the solenoid 39a, causing engagement of the main clutch 11. Since the vehicle speed is fifteen miles per hour or above, the switch 111 under action of the governor 113 is open, and so coil 115 is not energized, with the result that switch 120 is permitted to stay open, leaving the main clutch 11 engaged. The output shaft 57 is now in the fourth speed ratio.

Suppose that the transmission is in indirect drive, with the result that switches 93 and 118 are open through the action of the raised portion 98 of the cam and thereby magnetic clutch 45 is disengaged and main clutch 11 is engaged. The output shaft 57 is in the second speed. If now the switches 93a and 118a are closed, bypassing the switches 93 and 118, the magnetic clutch 45 will be engaged with positioning of the accelerator pedal 101 just beyond the idle position, and the main clutch 11 is subject to the action of the governor 113. If at the time of closing of the switches 93a and 118a the speed of the vehicle is fifteen miles per hour or above, the governor 113 will have opened the switch 111. Thus the coil 115 remains deenergized, the switch 120 remains open, and the main clutch 11 remains engaged. Thus the output shaft 57 remains in second speed ratio. If at the time of closing of the switches 93ᵃ and 118ᵃ the speed of the vehicle is twelve miles per hour or below or if this happens after closing of switches 93ᵃ and 118ᵃ, the governor 113 causes switch 111 to close, thereby energizing coil 115, closing switch 120, energizing solenoid 39ᵃ, and disengaging the main clutch 11. The magnetic clutch 45 being engaged with the position of the accelerator pedal 101 just beyond idle position, drive is through the magnetic clutch, and the output shaft 57 is now in the first speed ratio. If during operation of the output shaft in the first speed ratio vehicle speed rises to fifteen miles per hour or above, and the operator wishes to return the output shaft to the second speed ratio, he will release the accelerator pedal to idle position, thereby causing the member 140 to move the arm 141 to the right and opening the switch 120. This deenergizes the solenoid 39ᵃ, causing engagement of the main clutch 11. Since the vehicle speed is fifteen miles per hour or above, the switch 111 under action of the governor 113 is open, and so coil 115 is not energized, with the result that switch 120 is permitted to stay open, leaving the main clutch 11 engaged. The output shaft 57 is now in the second speed ratio.

Suppose that the output shaft 57 is in the fourth speed ratio, because the speed of the vehicle is above fifteen miles per hour, and the transmission is in direct drive. Suppose now that the operator wishes to operate the output shaft 57 in the third speed ratio in order to obtain a greater acceleration for passing another vehicle. The speed of the vehicle is too high to permit this to be accomplished through closing of the governor-controlled switch 111. However, it may be accomplished through closing of the "kickdown" switch 123. The accelerator pedal 101 is depressed beyond the position for a full opening of the throttle valve 128. The stop 142ᵃ prevents the throttle valve from moving beyond a position of full opening, but the spring 137ᵃ in cylinder 137 permits further movement of the accelerator pedal 101. When the accelerator pedal 101 has reached the position for a full opening of the throttle valve 128, the bent end of the rod 103 connected to the accelerator pedal will have reached the left end of the slot 124 in the member 125. Further movement of the accelerator pedal 101 causes the rod 103 to move the member to the left, causing the reduced end 126 on the member 125 to contact the element 126ᵃ and thereby closing the switch 123, formed of the reduced end 126 and the element 126ᵃ. Thus the coil 115 is energized, the switch 120 is closed, the solenoid 39ᵃ is energized, and the main clutch 11 is disengaged. Since now the drive is through the magnetic clutch 45, and the transmission is in direct drive, the output shaft 57 is in the third speed ratio. If the operator desires to continue the third speed ratio with less than a full opening of the throttle valve 128, he permits the accelerator pedal to rise to the desired point for this. Because of the slot 124 the movement to the right of the rod 103 due to rise of the accelerator pedal to a position producing some intermediate throttle opening is without effect upon the member 125, and so the switch 123 remains closed, continuing the disengagement of the main clutch 11, and operation of the output shaft 57 in the third speed ratio. When the operator again desires the fourth speed ratio, he releases the accelerator pedal to idle position. The bent end of the rod 103 engages the right end of the slot 124 in the member 125, moving the member to the right and thereby opening switch 123. Release of the accelerator pedal to idle position also causes the member 140 to move the arm 141 to the right, opening switch 120. Since the governor-controlled switch 111 is already open, and the switches 120 and 123 are open, the solenoid 39ᵃ is no longer energized, and the main clutch 11 is reengaged, thereby returning the output shaft 57 to the fourth speed ratio. Closing of the switch 123 is prevented when the vehicle speed has reached a certain high value, for example, fifty miles per hour, and the throttle valve 128 is in the position of full opening, for under these conditions the suction exerted on the plunger 132 through the passage leading to the plunger from the carburetor Venturi section 130 will be sufficient to raise the plunger, thereby causing the lower edge of the opening 124 in the extension 133 on the plunger to rise to position where it will engage the shoulder formed on the member 125 between the body thereof and the reduced end 126. If under these conditions the operator tries to depress the accelerator pedal 101 to "kickdown" position, movement of the member 125 beyond a position of engagement of the aforementioned shoulder on the member with the lower edge of the opening 124 is prevented. Thus the reduced end 126 cannot contact the element 126ᵃ, and so the switch 123 remains open.

As just described for the transfer of the output shaft 57 from the fourth speed rates to the third speed ratio by depression of the accelerator pedal 101 to "kickdown" position, the operator may in the same way effect a transfer of the output shaft from the second speed ratio to the first speed ratio. However, there is less need for this transfer, for under most conditions it will be satisfactory for the output shaft 57 to be in the second speed ratio at a vehicle speed greater than twelve or fifteen miles per hour. "Kickdown" from the second speed ratio to the first speed ratio will be prevented when the plunger 132 has risen to bring the lower edge of the opening 134 in the extension 133 into a position blocking the shoulder on the member 125, so that closing of the switch 123 is prevented. This will occur at full opening of the throttle valve 128 and at a vehicle speed proportional to fifty miles per hour times the ratio of the second speed to the fourth speed.

At the beginning of the description of operation it was stated that with the vehicle at rest after depression of the pedal 90 resulting in disengagement of the main clutch 11 the operator might shift the transmission into indirect, direct, or reverse drive. What happens when he shifts the transmission into indirect drive has already been described. If the vehicle is at rest and the operator shifts the transmission into direct drive, after release of the pedal 90 and positioning of the accelerator pedal 101 just beyond the idle position, the magnetic clutch 45 only will be engaged, since the vehicle speed is zero, and the output shaft 57 will be in the third speed ratio. When the vehicle speed rises to fifteen miles per hour or above, the operator may change the output shaft to fourth speed ratio by releasing the accelerator pedal to idle position, thereby opening the switch 120 for engaging the main clutch 11.

The operator may shift the transmission to indirect drive from direct drive with either third or fourth speed ratio of the output shaft. To do so he will depress the pedal 90 to insure disengagement of the main clutch 11 and will shift the connector 59 from engagement with the toothed section 60 on the gear 54. This causes the raised portion 98 of the cam to open switches 93 and 118, thereby disengaging the magnetic clutch 45. The operator shifts the connector 59 into engagement with the toothed section 61 on the gear 62 and then releases the pedal 90, which previously acted to disengage the main clutch 11 in spite of other controls tending to keep it engaged. If the switches 93$^a$ and 118$^a$ are open, the output shaft 57 will be in the second speed ratio regardless of whether it was previously in the third speed ratio or the fourth speed ratio and of what the vehicle speed is, for, since both switch 118 and switch 118$^a$ are open, current cannot flow through the solenoid 39$^a$ so as to disengage the main clutch 11, apart from whether the switch 120 opened only by return of the accelerator pedal 101 to idle position, the switch 111 opened only by fall of the vehicle speed below twelve miles per hour, or "kickdown" switch 123 opened only by return of the accelerator pedal to idle position is closed. However, if the switches 93$^a$ and 118$^a$ are closed, then the speed ratio of the output shaft 57 upon shift by the operator of the transmission from direct drive to indirect drive will depend upon the speed ratio of the output shaft and the vehicle speed before the transmission shift. If the output shaft was in the fourth speed ratio, then the transmission shift brings the output shaft to the second speed ratio, for in the fourth speed ratio the vehicle speed must have been high enough for the switches 111 and 120 to have been open. The vehicle speed not falling to twelve miles per hour or below during shifting, these switches will remain open, and so the main clutch 11 must be engaged, and thus the output shaft is in the second speed ratio. If the output shaft was in the third speed ratio, and the accelerator pedal was not returned to idle position, then, apart from vehicle speed, the transmission shift brings the output shaft to the first speed ratio, for in the third speed ratio at least the switch 120 must have been closed and could have been opened only by release of the accelerator pedal to idle position. If the vehicle speed was above fifteen miles per hour and the output shaft was in the third speed ratio, release of the accelerator pedal 101 during the shifting opens the switch 120, thereby engaging the main clutch 11, and the output shaft is in the second speed ratio after shifting. If the output shaft was in the third speed ratio, and the vehicle speed was under twelve miles per hour or under fifteen miles per hour without just previously having been fifteen miles per hour or above, then the transmission shift brings the output shaft to the first speed ratio, apart from whether the accelerator pedal is released to idle position during shifting of the transmission.

Upon starting the operator may also shift the transmission into reverse drive. He does this by moving the idler gear 72$^b$ to the right into engagement with the reverse gear 72$^a$. This will be carried out by means, not shown. It is sufficient to state that this means will be so related with the shifter 97 and the connector 59 that the connector 59 is in the position shown in Fig. 1, i. e. out of engagement with toothed sections 60 and 61 whenever idler gear 72$^b$ engages reverse gear 72$^a$, and conversely that the means will not permit the idler gear 72$^b$ to engage the reverse gear 72$^a$ when the connector 59 engages one of the toothed sections 60 and 61. Before shifting he will, of course, have depressed the pedal 90 to disengage the main clutch 11. When he releases the pedal 90, the main clutch will be reengaged, and drive will be through main clutch 11, shaft 20, gear 54, gear 67, sleeve 66, gear 65, idler gear 72$^b$, and reverse gear 72$^a$ to the output shaft 57. The above takes place if the manual controlled switches 93$^a$ and 118$^a$ are open, for then the main clutch 11 must be engaged, and the magnetic clutch must be disengaged, since the raised portion 98 of the cam keeps open the switches 93 and 118. If, however, the switches 93$^a$ and 118$^a$ are closed, then two speed ratios of the output shaft 57 are obtained in reverse. On starting in reverse a low speed ratio will be obtained, since the magnetic clutch 45 will be engaged, and the main clutch 11 will be disengaged, because the speed will be below fifteen miles per hour. The drive will be through the magnetic clutch 45, gear 49, gear 72, shaft 71, sleeve 66, gear 65, idler gear 72$^b$, and reverse gear 72$^a$ to output shaft 57. If the vehicle speed rises to fifteen miles per hour or above, then opening of the governor-operated switch 111 causes engagement of the main clutch 11, and drive is transmitted through it with the magnetic clutch 45 being overrun. A high speed ratio in reverse is now obtained. If the vehicle speed drops to twelve miles per hour or less, the governor-operated switch 111 is closed, the main clutch 11 is disengaged, and the drive is again through the magnetic clutch 45 with a return to the low speed ratio in reverse.

Figs. 4 and 5 show an alternate form of transmission control. For the most part the circuit of Fig. 4 is the same as that of Fig. 3. Like reference characters are used to designate like parts. Specific mention will be made only of the differences between the circuits. There is no switch in the line 117, and so the main clutch 11 is controlled as though the manually controlled switch 118$^a$ of Fig. 3 were closed all the time. Thus when the transmission is in indirect drive, the main clutch 11 may be disengaged through the "kickdown" switch 123 or through the governor-controlled switch 111 in order that drive may be through the magnetic clutch 45, and the output shaft may be in the first speed ratio. There is no switch in the line 91 that is closed by depression of the accelerator pedal 101. Thus engagement of the magnetic clutch 45 is not dependent upon the accelerator pedal. There are no switches 93 and 93$^a$ in the line 91, but instead there is a switch 143, which is in open position when the transmission is in neutral and is closed when the transmission is in indirect drive or direct drive. Thus so long as the transmission is not in neutral, the switch 143 is closed, coil 95 is energized, switch 106 is closed, and magnetic clutch 45 is engaged. Accordingly, when as described above, a low vehicle speed acts through switch 111 or a "kickdown" position of the accelerator pedal 101 acts through switch 123 to disengage the main clutch 11, the magnetic clutch 45 is already engaged in indirect drive of the transmission so as to transfer the output shaft 57 from the second speed ratio to the first speed ratio.

The switch 143 is illustrated in detail in Fig. 5. The line 91 extends to a connection point 144 from which extend lines 145 and 146 terminating in contacts 147 and 148, respectively. Contacts 149 and 150, connected to a line 151, connected in turn to a line 152, leading to a ground 153, are engageable with contacts 147 and 148, respectively. When the transmission is in neutral as shown, contacts 149 and 150 are spaced from contacts 147 and 148. Thus no current flows in line 91, and magnetic clutch 45 is not engaged. Shifting of connector 59 to the right to bring the transmission to indirect drive through engagement of the connector 59 with the toothed section 61 on gear 62 causes the connector 59 to move the contact 150 into engagement with the contact 148. Current now flows in line 91, and magnetic clutch 45 is engaged. Shifting of connector 59 to the left to bring the transmission to direct drive through engagement of the connector 59 with the toothed section 60 on gear 54 causes the connector 59 to move the contact 149 into engagement with the contact 147. Current now flows in the line 91, and magnetic clutch 45 is engaged. Connected in the line 152 is a lamp 154. The lamp is lit when the transmission is in indirect drive or in direct drive and is unlit when the transmission is in neutral.

An important part of the present invention is the use of the overrunning clutch as a connection between the sleeve 66 and the shaft 71 and in a broader sense between the transmission and the magnetic clutch 45. By virtue of the overrunning clutch drive may be transmitted through the main clutch 11, even though the magnetic clutch 45 is engaged. The overrunning clutch is of considerable advantage even when the magnetic clutch is disengaged, for because of the residual magnetism in the magnetic clutch the latter may have some drag even when it is disengaged. Another advantage in the use of the overrunning clutch is that only the main clutch need be disengaged when the transmission is shifted. If the output shaft is in the second speed ratio, and the transmission is to be shifted from indirect drive to direct drive, only the main clutch need be disengaged by depression of the pedal 90 before a shift of the connector 59 can be made. The magnetic clutch is already being overrun and so exerts no force that would tend drive gear 62 and so prevent disengagement of the connector 59 from the toothed section 61 on gear 62. If the connector 59 is shifted forthwith into engagement with the toothed section 60 on the gear 54, there will be no resistance to the shift from the magnetic clutch for the latter is still being overrun. When the operator causes the pedal 90 to rise, presumably the main clutch 11 will be reengaged, for the vehicle speed will doubtlessly have been kept high enough during the transmission shift for the governor-operated switch 111 to have stayed open, thereby insuring the reengagement of the main clutch 11. If the output shaft is in the first speed ratio, and a shift of the transmission is to be made, obviously the pedal 90 need not be depressed, for the main clutch 11 is already disengaged. Moreover, the magnetic clutch 45 need not be disengaged even though drive is being transmitted through it. Just before the shift of the connector 59 the operator will allow the accelerator pedal to rise to a position for a smaller opening of the throttle valve. Thus for a short time the sleeve 66 attempts to drive the shaft 71, or the transmission the magnetic clutch, but since the overrunning clutch 69 connects the sleeve and the shaft, the sleeve merely overruns the shaft, and there is no force exerted by the magnetic clutch that would resist disengagement of the connector 59 from the toothed section 61 of the gear 62.

Thereafter without delay the operator moves the connector 59 into engagement with the toothed section 61 on the gear 54, and the output shaft 57 is in the third speed ratio. There is no resistance to this movement of the connector since the magnetic clutch is still being overrun.

Another important aspect of the present invention is the location of the transmission casing wall 53 and the bearing 52 between the gear 49 and the gear 54. Gear 49 constitutes one input of the dual input to the transmission, i. e., the input coming from the magnetic clutch 45. Gear 54 constitutes the other input to the transmission, i. e., the input coming from the main clutch 11. Obviously the gear 54 must be within the transmission to the right of the wall 53 and the bearing 52. If the gear 49 were also to the right of the wall and the bearing, then the gear 54 would have to be farther to the right, and there would be an objectionable overhang of the shaft 20 carrying the gear 54. In the present arrangement the shaft 20 extends only a short distance beyond the bearing 52, and so the overhang of shaft 20 is minimized. Also the load of the gear 49 is imposed on the shaft 20 immediately adjacent the bearing 52.

We claim:

1. In a vehicle driving system, the combination with an engine and a driving means driven from said engine, of a change-speed transmission, a main clutch adapted drivingly to connect the driving means and the transmission, an auxiliary magnetic clutch adapted drivingly to connect the engine and the transmission in parallel bypassing relation to the main clutch electrical circuit means under control of the vehicle driver for selectively conditioning driving connection of said driving means and transmission through either of said clutches for starting said vehicle from rest, and automatically releasable means for facilitating drive of the transmission through said main clutch when both of said clutches are in operative condition.

2. In a vehicle driving system the combination with an engine and a driving means driven from said engine, a change-speed transmission, a main clutch having a driving part drivingly connected with the driving means and a driven part drivingly connected with the transmission, an auxiliary magnetic clutch adapted drivingly to connect the driving part of the main clutch and the transmission and means limiting engaging operation of said magnetic clutch to an engine condition above idle speed operation of said engine.

3. In a vehicle driving system the combination with an engine provided with a throttle valve, a driving means driven from said engine and a control member for said throttle, a change-speed transmission, a main clutch adapted drivingly to connect the driving means and the transmission, an auxiliary magnetic clutch drivingly connected with the driving means, and means drivingly connecting the magnetic clutch and the transmission and including means providing for overrunning of the transmission with respect to the magnetic clutch to permit drive to be transmitted from the driving means through the main clutch to the transmission in spite of engagement of the magnetic clutch and means including an element operable by said throttle control member for controlling engagement of said magnetic clutch and disengagement of said main clutch at a predetermined position of said throttle control member.

4. In combination, a driving means, a change-speed transmission, a driven means adapted to be driven by the transmission, a first clutch adapted drivingly to connect the driving means and the change-speed transmission, a second clutch adapted drivingly to connect the driving means and the change-speed transmission in parallel by-passing relation to the first clutch, a control member for regulating the rate of fuel flow to an engine driving the driving means, means associating the first clutch and the control member so as to cause location of the control member at or beyond a position representing a certain maximum rate of fuel flow to effect disengagement of the first clutch, and means connecting the control member and the second clutch for causing location of the control member at a position beyond that representing a minimum rate of fuel flow to effect engagement of the second clutch.

5. In combination, a driving means, a change-speed transmission spaced from the driving means, a first clutch positioned between the transmission and the driving means adjacent the driving means for drivingly connecting the driving means and the transmission, a second clutch positioned between the driving means and the transmission adjacent the transmission for connecting the driving means and the transmission in independent by-passing relation to the first clutch, a vacuum-operated control positioned between the clutches for disengaging the first clutch, and electrically operated magnetic means for engaging the second clutch.

6. In combination, a driving shaft, a change-speed transmission spaced from the driving shaft, a first clutch formed of a driving casing part secured to the driving shaft and a driven part contained by and engageable with the driving casing part, an intermediate shaft secured to the driven part of the clutch and drivingly connected with the transmission, a sleeve secured to the driving casing part and surrounding the intermediate shaft, a second clutch positioned adjacent the transmission in spaced relation to the first clutch and comprising a driving part secured to the sleeve and a driven part drivingly connected to the transmission, vacuum-operated means surrounding the sleeve between the clutches for disengaging the first clutch, and magnetic means for engaging the second clutch.

7. In combination, a driving means, a change-speed transmission, a first clutch adapted drivingly to connect the driving means and the transmission, a second clutch adapted drivingly to connect the driving means and the transmission in by-passing relation to the first clutch, a control member movable for regulating by its position the rate of fuel flow to an engine for driving the driving means, means under control of the control member operable in response to movement thereof in a rate increasing direction to a position beyond the position for minimum rate of fuel flow to disengage the first clutch, and means for delaying re-engagement of the first clutch until return of the control member to the position for minimum rate of fuel flow.

8. In combination, a driving means, a change-speed transmission, a driven means adapted to be driven by the transmission, a first clutch adapted drivingly to connect the driving means and the transmission at a certain speed ratio, a second clutch adapted drivingly to connect the driving means and the change-speed transmission at a lower speed ratio in parallel by-passing relation to the first clutch, means operable for engaging and disengaging said first clutch, means including governor means for controlling said clutch operating means, said governor means being operable below a certain speed of the driven means for controlling said first clutch for disengagement by said operating means and operable above said certain speed for controlling said first clutch for engagement by said operating means, a throttle control member operable throughout a range of movement for controlling the supply of fuel to an engine driving the driving means, means operable in response to movement of the throttle control member to a position at or near that for maximum feed of fuel to the engine for effecting disengagement of said first clutch independently of the control effected by said governor means, and means operable in response to movement of the throttle control member to any position beyond that for minimum rate of fuel flow to the engine for effecting engagement of the second clutch.

9. In combination, a driving means, a change-speed transmission, a driven means adapted to be driven by the transmission, a first clutch adapted drivingly to connect the driving means and the transmission at a certain speed ratio, a second clutch adapted drivingly to connect the driving means and the change-speed transmission at a lower speed ratio in parallel by-passing relation to the first clutch, means operable for engaging and disengaging said first clutch, means including governor means for controlling said clutch operating means, said governor means being operable below a certain speed of the driven means for controlling said first clutch for disengagement by said operating means and operable above said certain speed for controlling said first clutch for engagement by said operating means, a member for controlling by its position the rate of flow of fuel to an engine driving the driving means, means operable in response to positioning of the control member to a position establishing a certain high rate of fuel flow for effecting engagement of said first clutch by said operating means and for maintaining engagement of the said first clutch until return of the said control member to a position establishing a certain minimum rate of fuel flow, all independently of the control effected by the governor means, and means operable in response to movement of the control member in a direction for increasing the rate of fuel flow to a position beyond its position for minimum rate of fuel flow for effecting engagement of the second clutch.

10. In combination, a driving means, a change-speed transmission, a driven means adapted to be driven by the transmission, a first clutch adapted drivingly to connect the driving means and the change speed transmission, a second clutch adapted drivingly to connect the driving means and the change speed transmission in parallel by-passing relation to the first clutch, means operable for engaging and disengaging said first clutch, means responsive to the speed of the driven means for controlling said operating means for effecting engagement of the first clutch above a certain speed of the driven means and disengagement thereof below the said certain speed, a control member for regulating by its position the rate of fuel flow to an engine driving the driving means, means operable in response to positioning of the control member at or beyond a position in a rate increasing direction representing a certain maximum rate of fuel flow for effecting disengagement of the first clutch independently of the tendency of the speed responsive means to effect its engagement above the said certain speed of the driven means, and means operable in response to positioning of the control member to a position in a rate increasing direction beyond that representing a minimum rate of fuel flow for effecting engagement of the second clutch.

11. In combination, a driving means, a driven means, a change-speed transmission for driving the driven means, a first clutch adapted drivingly to connect the driving means and the transmission at a certain speed ratio, a second clutch adapted to connect the driving means and the transmission at a lower speed ratio, overrunning means drivingly connected between the second clutch and the driven means for permitting the first clutch to drive the transmission in spite of engagement of the second clutch, a control member movable for regulating by its position the rate of fuel flow to an engine driving the driving means, means under control of the control member operable in response to positioning of the control member to a position representing a rate of fuel flow substantially higher than the minimum rate for effecting disengagement of the first clutch and for maintaining the first clutch disengaged until return of the control member to a position representing the minimum rate of fuel flow, and means under control of the control member operable in response to movement of the control member to a position beyond the position representing the minimum rate of fuel flow for effecting engagement of the second clutch.

12. In combination, a driving means, a change-speed transmission, a driven means adapted to be driven by the change-speed transmission, a first clutch adapted drivingly to connect the driving means and the transmission at a certain ratio, a second clutch adapted drivingly to connect the driving means and the transmission at another speed ratio in by-passing relation to the first clutch, control means including a solenoid for controlling said first clutch, said control means being operable upon energization of said solenoid for disengaging the first clutch and upon deenergization thereof for engaging the first clutch, switch means operable to open position in response to establishment of the driven means at a speed above a certain value for effecting deenergization of said solenoid to effect engagement of the first clutch and operable to closed position in response to establishment of the driven means at a speed below the said certain value for effecting energization of said solenoid to effect disengagement of the first clutch, a control member movable for regulating by its position the rate of fuel flow to an engine driving the driving means, a second switch operable to closed position upon advancement of the control member to a position representing a rate of fuel flow substantially greater than the minimum rate for effecting energization of said solenoid to thereby effect disengagement of said first clutch, means for preventing re-engagement of the first clutch until return of the control member to a position representing the minimum rate of fuel flow, electromagnetic means energizable for engaging the second clutch, and a third switch operable by the control member to closed position upon advancement of the control member to a position just beyond the position for minimum rate of fuel flow for energizing said electromagnetic means to effect engagement of the second clutch.

13. In combination, a driving shaft, a change-speed transmission spaced from the driving shaft, a first clutch formed of a driving casing part secured to the driving shaft and a driven part contained by and engageable with the driving casing part, an intermediate shaft secured to the driven part of the clutch and drivingly connected with the transmission, a sleeve secured to the driving casing part and surrounding the intermediate shaft, a second clutch positioned adjacent the transmission in spaced relation to the first clutch and comprising a driving part secured to the sleeve and a driven part drivingly connected to the transmission, vacuum-operated means surrounding the sleeve between the clutches for disengaging the first clutch, a control member movable for regulating by its position the rate of fuel flow to an engine driving the driving shaft, means under control of the control member operable in response to movement thereof in a rate increasing direction to a position well beyond that for minimum rate of fuel flow for actuating the vacuum-operated means to effect disengagement of said first clutch, means for preventing re-engagement of the first clutch until return of the control member to its position for minimum fuel flow, magnetic means for engaging the second clutch, and means under control of the control member operable in response to advancement of the control member in a rate increasing direction to a position just beyond that for minimum fuel flow for actuating said magnetic means to effect engagement of the second clutch.

14. In combination, a driving shaft, a change speed transmission spaced from the driving shaft, a first clutch formed of a driving casing part secured to the driving shaft and a driven part contained by and engageable with the driving casing part, an intermediate shaft secured to the driven part of the clutch and drivingly connected with the transmission, a sleeve secured to the driving casing part and surrounding the intermediate shaft, a second clutch positioned adjacent the transmission in spaced relation to the first clutch and comprising a driving part secured to the sleeve and a driven part drivingly connected to the transmission, vacuum-operated means surrounding the sleeve between the clutches for disengaging the first clutch, a driven shaft driven by the transmission, speed responsive means drivingly connected to the driven shaft and operable to control said vacuum-operated means, said speed responsive means being operable above a certain speed of the driven shaft for effecting engagement of said first clutch and operable below said certain speed for effecting disengagement of said first clutch, a control member movable for regulating by its position the rate of fuel flow to an engine driving the driving shaft, means under control of the control member operable in response to movement thereof in a rate increasing direction to a position well beyond that for minimum rate of fuel flow for actuating the vacuum-operated means to effect disengagement of said first clutch and even though said speed-responsive means is at or above its speed for effecting engagement of the first clutch, means for preventing re-engagement of the first clutch after disengagement thereof until return of the control member to its position for minimum fuel flow, magnetic means for engaging the second clutch and means under control of the control member operable in response to advancement of the control member in a rate increasing direction to a position just beyond that for minimum fuel flow for actuating said magnetic means to effect engagement of the second clutch.

15. In combination, a driving shaft, a change-speed transmission spaced from the driving shaft, a first clutch formed of a driving casing part secured to the driving shaft and a driven part contained by and engageable with the driving casing part, an intermediate shaft secured to the driven part of the clutch and drivingly connected with the transmission, a sleeve secured to the driving casing part and surrounding the intermediate shaft, a second clutch positioned adjacent the transmission in spaced relation to the first clutch and comprising a driving part secured to the sleeve and a driven part drivingly connected to the transmission, vacuum-operated means surrounding the sleeve between the clutches for disengaging the first clutch, a driven shaft driven by the transmission, speed-responsive means drivingly connected to the driven shaft and operable to control said vacuum-operated means, said speed responsive means being operable above a certain speed of the driven shaft for effecting engagement of said first clutch and operable below said certain speed for effecting disengagement of said first clutch, a control member movable for regulating by its position the rate of fuel flow to an engine driving the driving shaft, means under control of the control member operable in response to movement thereof in a rate increasing direction to a position beyond that for minimum rate of fuel flow for actuating the vacuum-operated means to effect disengagement of said first clutch and even though said speed-responsive means is at or above its speed for effecting engagement of the first clutch, means for preventing re-engagement of the first clutch until return of the control member to the position for minimum fuel flow, and magnetic means for engaging the second clutch.

16. In combination, a driving means, a change-speed transmission, a first clutch adapted drivingly to connect the driving means and the transmission, a second clutch adapted drivingly to connect the driving means and the transmission in by-passing relation to the first clutch, a driven means adapted to be driven by the transmission, speed responsive means drivingly connected to the driven means and operable to control the first clutch, said speed-responsive means being operable above a certain speed of the driven means for controlling said first clutch for engagement and operable below the said certain speed for controlling said first clutch for disengagement, a control member movable for regulating by its position the rate of fuel flow to an engine driving the driving means, means under control of the control member operable in response to movement thereof in a rate increasing direction to a position beyond the position for minimum rate of fuel flow for controlling disengagement of said first clutch, and means for delaying re-engagement of the first clutch until return of the control member to the position for minimum rate of fuel flow.

17. In combination, a driving means, a change-speed transmission, a driven means adapted to be driven by the transmission, a first clutch adapted drivingly to connect the driving means and the transmission, a second clutch adapted drivingly to connect the driving means and the transmission in by-passing relation to the first clutch and at a lower speed ratio than the first clutch, over-running means drivingly connected between the second clutch and the driven means for permitting the first clutch to drive the transmission in spite of engagement of the second clutch, speed-responsive means drivingly connected to the driven means and operable to control the first clutch, said speed-responsive means being operable above a certain speed of the driven means for controlling said first clutch for engagement and operable below the said certain speed for controlling said first clutch for disengagement, a control member movable for regulating by its position the rate of fuel flow to an engine for driving the driving means, means under control of the control member operable in response to movement thereof in a rate increasing direction to a position beyond the position for minimum rate of fuel flow for controlling disengagement of said first clutch, and means for delaying re-engagement of the first clutch until return of the control member to the position for minimum rate of fuel flow.

18. In combination, a driving means, a change speed transmission, a driven means adapted to be driven by the transmission, a first clutch adapted drivingly to connect the driving means and the transmission, a second clutch adapted drivingly to connect the driving means and the transmission in by-passing relation to the first clutch and at a lower speed ratio than the first clutch, over-running means drivingly connected between the second clutch and the driven means for permitting the first clutch to drive the transmission in spite of engagement of the second clutch, speed responsive means drivingly connected to the driven means and operable to control the first clutch, said speed responsive means being operable above a certain speed of the driven means for controlling said first clutch for engagement and operable below said certain speed for controlling said first clutch for disengagement, a control member movable for regulating by its position the rate of fuel flow to an engine for driving the driving means, means under control of the control member operable in response to movement thereof in a rate increasing direction to a position beyond the position for minimum rate of fuel flow for controlling disengagement of said first clutch, and means for delaying re-engagement of the first clutch after disengagement thereof until return of the control member to the position for minimum rate of fuel flow.

19. In combination, a driving means, a change-speed transmission having a high speed ratio and a low speed ratio, a first clutch adapted drivingly to connect the driving means and the transmission, a second clutch adapted drivingly to connect the driving means and the transmission in by-passing relation to the first clutch, a driven means adapted to be driven by the transmission, speed-responsive means drivingly connected with the driven means and operable to control the first clutch, said speed responsive means being operable above a certain speed of the driven means for effecting engagement of said first clutch and operable below the said certain speed for effecting disengagement of said first clutch, a control member movable for regulating by its position the rate of fuel flow to an engine for driving the driving means, means under control of the control member operable in response to movement thereof in a rate increasing direction to a position beyond the position for minimum rate of fuel flow to disengage the first clutch, means for preventing re-engagement of the clutch until return of the control member to the position for the minimum rate of fuel flow, means under control of the control member operable in response to advancement of the control member in a rate increasing direction to a position just beyond the position for minimum rate of fuel flow for actuating said second clutch to effect engagement thereof, and further control means for conditioning the transmission in the low speed ratio and operable to prevent engagement of the second clutch and prevent the speed-responsive means and the control member from causing disengagement of the first clutch.

20. In a vehicle driving system the combination with an engine provided with a throttle valve; of a driving means driven from said engine, a change speed transmission, a driven means adapted to be driven by the transmission, dual input drive transmitting means drivingly connectible between the driving means and transmission, said dual means including a first releasable drive transmitting means operable to provide power flow between the driving means and transmission along one path and a second releasable drive transmitting means operable to provide power flow between the driving means and transmission along a second path paralleling the said one path, overrunning means arranged between the driving and driven means and operable to effect drive therebetween when the power flow is along said second path, speed responsive governor means and driver operable throttle control means for conjointly controlling said releasable driving means and thereby said power paths and other means for independently controlling said releasable driving means.

21. In a vehicle driving system the combination with an engine provided with a throttle valve; of a driving means driven from said engine, a change speed transmission, a driven means adapted to be driven by the transmission, a driver operable throttle valve control means, dual input drive transmitting means drivingly connectible between said driving means and the transmission and including a first releasable clutch engageable to establish a predetermined speed ratio drive between the driving means and the transmission along a first path, and a second releasable clutch engageable to establish a slower speed ratio drive between the driving means and the transmission along a second path, overrunning means operable in the drive between said driving means and driven means, said overrunning means being operable to release the drive between said driving and driven means established by said second clutch along said second path, when said first clutch is engaged to establish drive along said first path and said second clutch remains engaged, electromagnetic means for controlling said clutches, and means operable by said driver operable control means for effecting conditioning of said electromagnetic means to obtain release of said first clutch and engagement of said second clutch.

22. In a vehicle driving system the combination with an engine provided with a throttle valve; of a driving means driven from said engine, a change speed transmission, a driven means adapted to be driven by the transmission, a driver operable throttle valve control means, dual input drive transmitting means drivingly connectible between said driving means and the transmission and including a first releasable clutch engageable to establish a predetermined speed ratio drive between the driving means and the transmission along a first path, and a second releasable clutch engageable to establish a slower speed ratio drive between the driving means and the transmission along a second path, overrunning means operable in the drive between said driving means and driven means, said overrunning means being operable to release the drive between said driving and driven means established by said second clutch along said second path, when said first clutch is engaged to establish drive along said first path and said second clutch remains engaged, electromagnetic means for controlling said clutches, and means operable by said driver operable control means for effecting conditioning of said electromagnetic means to obtain release of said first clutch and engagement of said second clutch, said second clutch having a driving and a driven side and said second clutch being of a type composed of plates alternately connected to said driving and driven sides and having magnetizable parts directed toward one another during engagement of the second clutch so as to press the said plates into driving engagement with one another, the said system being such that any drag of the plates on one another due to residual magnetism occurring during disengagement of the second clutch and engagement of the first clutch of the first driving path being without effect upon the transmission because of the said overrunning means in the second driving path.

23. In combination, a driving means, a change speed transmission, dual input means to the transmission comprising means providing a first driving path connecting the driving means and transmission and including a first clutch and a shaft, and means providing a second driving path connecting the driving means and the transmission and including a second clutch and a sleeve surrounding said shaft, means comprising a vacuum operable device positioned between said clutches and surrounding said sleeve for controlling engagement and release of one of said clutches, solenoid means for controlling said vacuum device, electromagnetic means for effecting when energized, engagement of the other of said clutches and electrical circuit means under control of the operator for controlling said electromagnetic and solenoid means.

24. In a vehicle driving system including an engine driven fluid power transmitting device the combination comprising a driving means including a clutch drivingly connected to said fluid device, a driven means, a change speed transmission having a casing including a transverse wall defining a chamber, a plurality of sets of constant mesh gearing in said chamber, means in said chamber for drivingly connecting said gearing to said driven means to establish at least two forward speeds of the vehicle for a given speed of the driving means, dual input means for drivingly connecting said driving means and gearing comprising means providing a first driving path between said driving means and gearing including a shaft journalled in said transverse wall and having an end extending therethrough into said chamber provided with a pilot portion for said driven means and carrying a gear, and having an opposite end connected with said driving means clutch and means providing a second driving path between said driving means and gearing including a gear journalled on said shaft outside said chamber adjacent said transverse wall, and means drivingly connecting said last mentioned gear and the gear within said chamber on the end of said shaft, including a gear in constant mesh with said gear outside said chamber, a coaxial gear within said chamber in constant mesh with said gear therein on the end of said shaft, and an overrunning drive connection between said coaxial gears providing drive from said coaxial gear outside said chamber to said coaxial gear within said chamber, said gear on the end of said shaft within said chamber and said coaxial gear forming part of said constant mesh gearing therein.

25. In a vehicle driving system including an engine driven fluid power transmitting device the combination comprising a driving means drivingly connected to said fluid device, a change speed transmission having a casing including a transverse wall defining a chamber, change speed means in said chamber including a driven shaft, a countershaft paralleling said driven shaft and having an end projecting through said wall outside said chamber, and a gear journalled on said driven member in constant mesh with a gear on said countershaft, dual input means for drivingly connecting said driving means and change speed means comprising means providing a first driving path including an input shaft coaxial with said driven shaft and journalled in said transverse wall and having an end extending therethrough into said chamber, clutch means on said input shaft exterior of said chamber for directly drivingly connecting this shaft with said driving means, and means providing a second driving path including a sleeve surrounding said input shaft outside said chamber, a first gear journalled on said input shaft outside said chamber intermediate said sleeve and wall, clutch means for drivingly connecting said sleeve and gear, a second gear on said exterior projection of said countershaft and in constant mesh with said first gear, a third gear on said countershaft within said chamber, a fourth gear in said chamber fixed to the end of said input shaft projecting therein, said third and fourth gears being in constant mesh and means providing an overrunning connection between said second and third gears providing drive from said second to said third gear.

26. In a vehicle driving system the combination with an engine provided with a throttle valve; of a driving means driven from said engine, a change speed transmission, a driven means adapted to be driven by the transmission, dual input drive transmitting means drivingly connectible between the driving means and transmission, said dual means including a first releasable drive transmitting means operable to provide power flow between the driving means and transmission along one path and a second releasable drive transmitting means operable to provide power flow between the driving means and transmission along a second path paralleling the said one path, overrunning means arranged between the driving and driven means and operable to effect drive therebetween when the power flow is along said second path, and speed responsive governor means and driver operable throttle control means for conjointly controlling said releasable driving means and thereby said power paths.

CARL A. NERACHER.
WILLIAM T. DUNN.

REFERENCES CITED

The following references are of record in the file of this patent:

UNITED STATES PATENTS

| Number | Name | Date |
| --- | --- | --- |
| 794,899 | Sturtevant et al. | July 18, 1905 |
| 1,900,119 | Lysholm et al. | Mar. 7, 1933 |
| 2,046,428 | Riley | July 7, 1936 |
| 2,057,744 | Sanford | Oct. 20, 1936 |
| 2,098,716 | Budlong | Nov. 9, 1937 |
| 2,115,390 | Lasley et al. | Apr. 26, 1938 |
| 2,149,020 | Hering | Feb. 28, 1939 |
| 2,202,378 | Hertrich | May 28, 1940 |
| 2,322,479 | Schjolin | June 22, 1943 |
| 2,344,656 | Swennes | Mar. 21, 1944 |
| 2,345,860 | Scott-Iversen | Apr. 4, 1944 |
| 2,375,440 | Roche | May 8, 1945 |
| 2,376,545 | Livermore | May 22, 1945 |

FOREIGN PATENTS

| Number | Country | Date |
| --- | --- | --- |
| 722,646 | France | Jan. 4, 1932 |
| 777,388 | France | Nov. 26, 1934 |